United States Patent
Kuo

(10) Patent No.: US 9,611,884 B1
(45) Date of Patent: Apr. 4, 2017

(54) SUCTION CUP

(71) Applicant: Su-Chen Kuo, Changhua (TW)

(72) Inventor: Su-Chen Kuo, Changhua (TW)

(73) Assignee: TILS HOMEWARE LTD., British Columbia (CA)

( * ) Notice: Subject to any disclaimer, the term of this patent is extended or adjusted under 35 U.S.C. 154(b) by 0 days.

(21) Appl. No.: 15/192,865

(22) Filed: Jun. 24, 2016

(51) Int. Cl.
- *A45D 42/14* (2006.01)
- *F16B 47/00* (2006.01)
- *F16M 13/02* (2006.01)

(52) U.S. Cl.
CPC .......... *F16B 47/00* (2013.01); *F16M 13/022* (2013.01)

(58) Field of Classification Search
CPC ...... F16B 47/00; F16B 47/006; F16M 13/022
USPC ................ 248/205.5, 205.8, 683, 309.3, 363
See application file for complete search history.

(56) References Cited

U.S. PATENT DOCUMENTS

| | | | |
|---|---|---|---|
| 8,066,238 B1 * | 11/2011 | Kuo ................. | F16B 47/006 248/205.7 |
| 9,422,970 B1 * | 8/2016 | Fan .................. | F16B 47/00 |
| 2016/0097419 A1 * | 4/2016 | Huang .............. | F16B 47/00 248/205.7 |
| 2016/0331163 A1 * | 11/2016 | Handerhan ........ | A47G 19/10 |

* cited by examiner

*Primary Examiner* — Todd M Epps
(74) *Attorney, Agent, or Firm* — Che-Yang Chen; Law Offices of Scott Warmuth

(57) ABSTRACT

A suction cup may comprise a cup body, a locating unit, a pressing unit, a rotating plate, a shell and a connecting unit. The cup body has a suction face and a rear face, and a central portion of the rear face comprises a stepped column. The pressing unit has an upper part, two lower parts, and a second through hole penetrates through a central portion of the upper part, and the rotating plate has a first surface and a second surface, and a central axle protrudes from a central portion of the first surface. The central axle passes through the second through hole of the pressing unit and then engages with the stepped column such that the upper part and the second through hole are configured to secure and prevent the central axle from swing or shifting due to the heavy load.

10 Claims, 14 Drawing Sheets

A-A SECTION

B-B SECTION

SUCTION CUP

FIELD OF THE INVENTION

The present invention relates to a suction cup, and more particularly to a suction cup that can be firmly attached on a surface.

BACKGROUND OF THE INVENTION

Generally, referring to FIGS. 13 and 14, a conventional suction cup (70) comprises an inner face (71) and an outer face (72), and a neck portion (73) protrudes from a central portion of the outer face (72), and a hook (74) was formed at a lower portion of the neck portion (73). When suction cup (70) was attached on a surface such as a wall or a glass through the inner face (71), the hook (74) can be used to hang stuffs.

However, the conventional suction cup has following disadvantages: when the hook (74) loads too heavy, the neck portion (73) was pulled downwardly such that a vacuum portion (75) of the suction cup (70) moves toward an upper edge (76) thus breaking an air-tight seal and causing the suction cup (70) to detach from the surface. Therefore, there remains a need for a new and improved design for a suction cup to overcome the problems presented above.

SUMMARY OF THE INVENTION

The present invention provides a suction cup which comprises a cup body, a locating unit, a pressing unit, a rotating plate, a shell and a connecting unit. The cup body has a suction face and a rear face which is formed at an opposing side of the suction face, and a thickness between the suction face and the rear face is gradually thicker from top to bottom thus forming the suction face to be tilted. A central portion of the rear face comprises a stepped column, and a lifting tab protrudes from an outer periphery of a bottom portion of the cup body. The locating unit has an outer face and an inner face which is formed at an opposing side of the outer face, and a first through hole is formed at a central portion of the locating unit. The outer face is tilted and configured to bear against an outer periphery of the rear face, and a plurality of first protruding pieces and locking portions protrude from the inner face. Also, each of a top edge and a bottom edge of the first through hole comprises a recessed portion. The pressing unit has an upper part, and two lower parts respectively protrude from two opposite edges of the upper part. A second through hole penetrates through a central portion of the upper part, and each of two lower parts comprises at least a second protruding piece. The rotating plate has a first surface and a second surface, and a central axle protrudes from a central portion of the first surface. A stepped hole is formed at a central portion of the second surface, and a sliding slot located at an outer periphery of the central axle is communicated with the stepped hole. As a result, the stepped column of the cup body can pass through the sliding slot and be secured inside the stepped hole. Furthermore, a rail is formed around the central axle on the first surface, and a plurality of bumps protrude from an outer periphery of the rotating plate. The shell has a roof and an annual wall, and at least a connecting hole and an engaging hole respectively penetrate the roof. Thus, at least a hook protruding from a bottom surface of the connecting unit can hook on the engaging hole and the connecting unit can be secured on the roof through the engaging hole. With engaging the connecting unit on the shell, a hanging portion or a placing plate protruding from a top surface of the connecting unit is configured to provide a hanging or placing place for stuffs. Also, an inner periphery of the annual wall has at least a locating piece and a plurality of grooves, and each of the grooves is extended from the roof toward an opening of the shell.

Comparing with conventional suction cup, the present invention is advantageous because: (i) the central axle penetrates the second through hole of the pressing unit and then engages with the stepped column such that the upper part and the second through hole are configured to secure and prevent the central axle from swing or shifting due to the heavy load; (ii) with the suction face of the cup body and the outer face of the locating unit, the cup body can efficiently support the downward force from the shell when the stuffs are hung or placed on the connecting unit; and (iii) since the pressing unit is secured in the recessed portions and borne against the central axle to strengthen the interior structure of the cup body, the central axle is not swung or shifted by heavy load thereby preventing a vacuum zone of the cup body from moving toward an upper edge resulting in breaking an air-tight seal and causing the cup body to detach from the surface.

DETAILED DESCRIPTION OF THE INVENTION

The detailed description set forth below is intended as a description of the presently exemplary device provided in accordance with aspects of the present invention and is not intended to represent the only forms in which the present invention may be prepared or utilized. It is to be understood, rather, that the same or equivalent functions and components may be accomplished by different embodiments that are also intended to be encompassed within the spirit and scope of the invention.

Unless defined otherwise, all technical and scientific terms used herein have the same meaning as commonly understood to one of ordinary skill in the art to which this invention belongs. Although any methods, devices and materials similar or equivalent to those described can be used in the practice or testing of the invention, the exemplary methods, devices and materials are now described.

All publications mentioned are incorporated by reference for the purpose of describing and disclosing, for example, the designs and methodologies that are described in the publications that might be used in connection with the presently described invention. The publications listed or discussed above, below and throughout the text are provided solely for their disclosure prior to the filing date of the present application. Nothing herein is to be construed as an admission that the inventors are not entitled to antedate such disclosure by virtue of prior invention.

Figure 1:
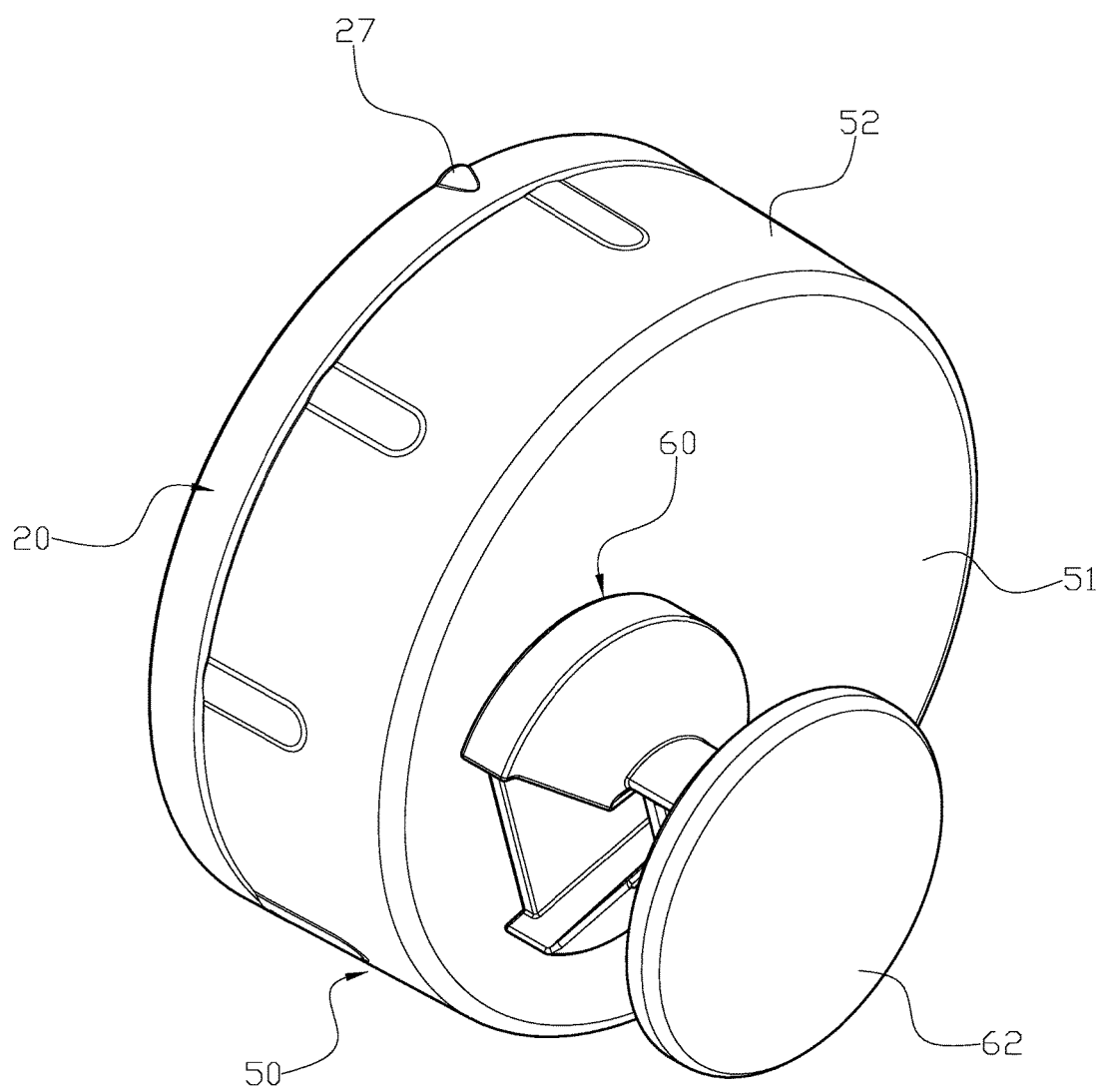
FIG. 1 is a three-dimensional assembly view of a suction cup in the present invention.
Figure 2:
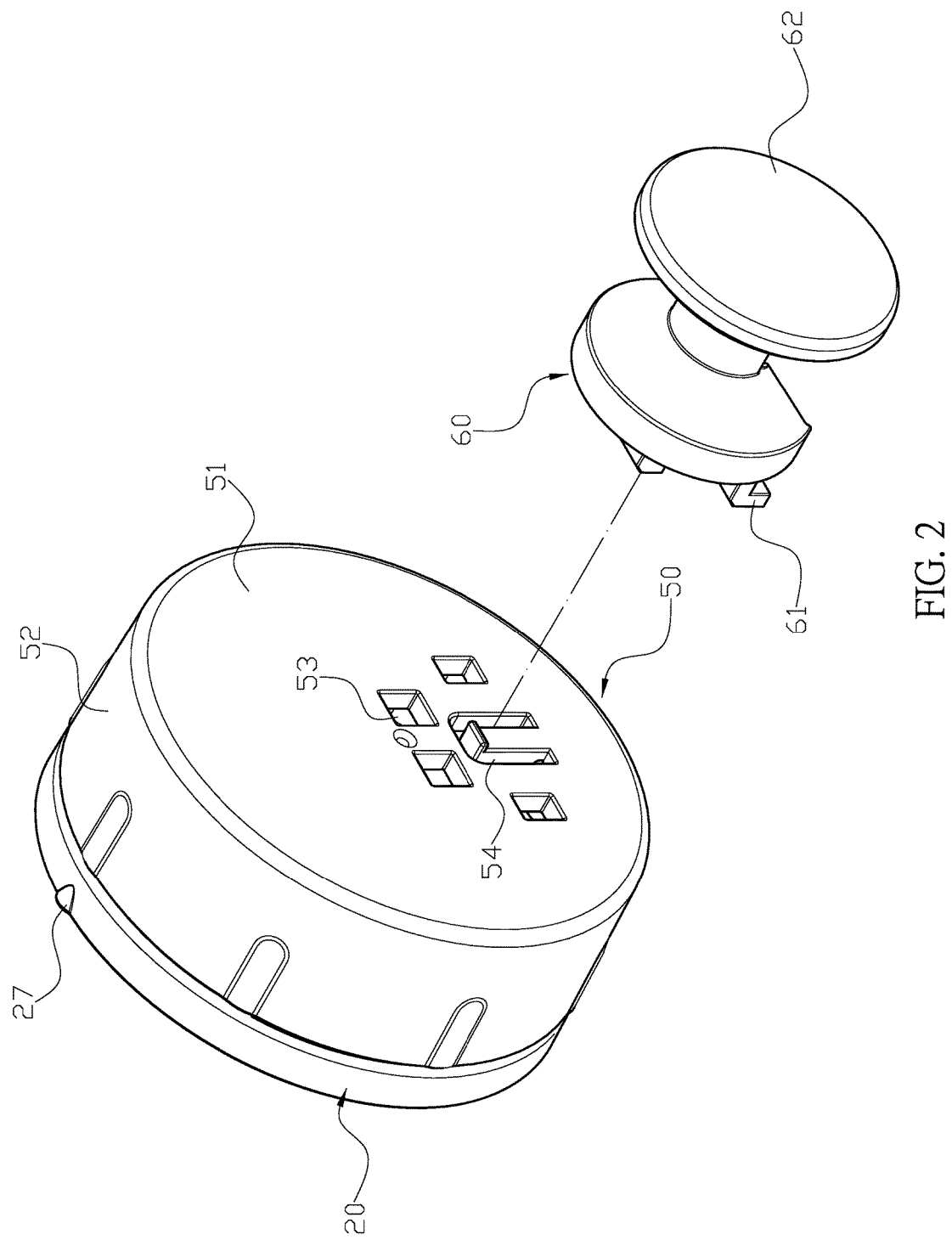
FIG. 2 is a three-dimensional exploded view of the suction cup in the present invention.
Figure 3:
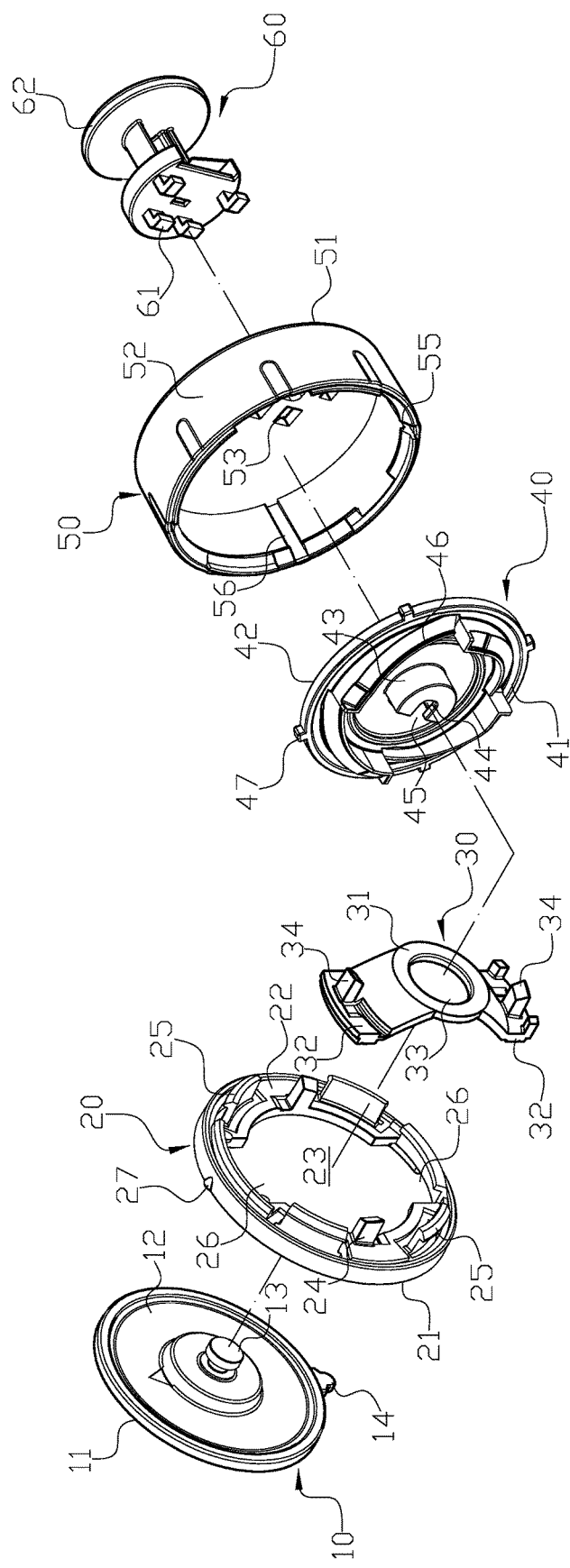
FIG. 3 is a detailed exploded view of the suction cup in the present invention.

In order to further understand the goal, characteristics and effect of the present invention, a number of embodiments along with the drawings are illustrated as following:

Referring to FIGS. 1 to 3, the present invention provides a suction cup which comprises a cup body (10), a locating unit (20), a pressing unit (30), a rotating plate (40), a shell (50) and a connecting unit (60). The cup body (10) has a suction face (11) and a rear face (12) which is formed at an opposing side of the suction face (11), and a thickness between the suction face (11) and the rear face (12) is gradually thicker from top to bottom thus forming the suction face (11) to be tilted. A central portion of the rear face (12) comprises a stepped column (13), and a lifting tab (14) protrudes from a bottom edge of the cup body (10). The locating unit (20) has an outer face (21) and an inner face (22) which is formed at an opposing side of the outer face, and a first through hole (23) is formed at a central portion of the locating unit (20). The outer face (21) is tilted and configured to bear against an outer periphery of the rear face (12), and a plurality of first protruding pieces (24) and locking portions (25) protrude from the inner face (22). Also, each of a top edge and a bottom edge of the first through hole (23) comprises a recessed portion (26). The pressing unit (30) has an upper part (31), and two lower parts (32) respectively protrude from two opposite edges of the upper part (31). A second through hole (33) penetrates through a central portion of the upper part (31), and each of two lower parts (42) comprises at least a second protruding piece (34). The rotating plate (40) has a first surface (41) and a second surface (42), and a central axle (43) protrudes from a central portion of the first surface (41). A stepped hole (44) is formed at a central portion of the second surface (42), and a sliding slot (45) located at an outer periphery of the central axle (43) is communicated with the stepped hole (44). As a result, the stepped column (13) of the cup body (10) can pass through the sliding slot (45) and be secured inside the stepped hole (44). Furthermore, a rail (46) is formed around the central axle (43) on the first surface (41), and a plurality of bumps (47) protrude from an outer periphery of the rotating plate (40). The shell (50) has a roof (51) and an annual wall (52), and at least a connecting hole (53) and an engaging hole (54) respectively penetrate the roof (51). Thus, at least a hook (61) protruding from a bottom surface of the connecting unit (60) can hook on the engaging hole (54) and the connecting unit (60) can be secured on the roof (51) through the engaging hole (54). With engaging the connecting unit (60) on the shell (50), a hanging portion (62) or a placing plate (63) protruding from a top surface of the connecting unit (60) is configured to provide a hanging or placing place for stuffs. Also, an inner periphery of the annual wall (52) has at least a locating piece (55) and a plurality of grooves (56), and each of the grooves (56) is extended from the roof (51) toward an opening of the shell (50).

Structurally, referring to FIGS. 1, 4, 5, and 6, the pressing unit (30) is located in the first through hole (23) of the locating unit (20), and the two lower parts (32) of the pressing unit (30) are respectively secured in the recessed portions (26) of the locating unit (20). The central axle (43) of the rotating plate (40) can pass through the second through hole (33), and the rotating plate (40) with the pressing unit (30) are secured in the first through hole (23) of the locating unit (20). Also, the cup body (10) is configured to connect to the rotating plate (40) by engaging the stepped column (13) with the stepped hole (44) through the sliding slot (45), and the lower parts (32) of the pressing unit (30) and the outer face (21) of the locating unit (20) are configured to bear against the outer periphery of the rear face (12) of the cup body (10) respectively. Moreover, the first protruding pieces (24) and the second protruding piece (34) are configured to support the rail (46) of the rotating plate (40), and the rotating plate (40) is connected to the shell (50) by sliding each of the bumps (47) in the grooves (56). Thus, the rotating plate (40) is configured to rotate with the shell (50) simultaneously. In addition, after connecting the shell (50) with the locating unit (20), through the design of the locking portions (25) and the locating piece (55), the shell (50) is configured to rotate relative to the locating unit (20) without falling out therefrom. Also, the connecting unit (60) is secured on the roof (51) of the shell (50) through the connecting holes (53) and the engaging hole (54).

In one embodiment, the cup body (10) is integrally formed of a single material.

In another embodiment, the cup body (10) is formed of a double-layer composite material comprising a soft inner layer and a hard outer layer. When the cup body (10) is attached on a rough or an uneven surface, through the soft inner layer, the cup body (10) can firmly be attached on the surface and achieve a preferable air-tight seal effect.

In still another embodiment, a recognizing portion (27) is formed at an outer periphery of the locating unit (20).

Figure 4:
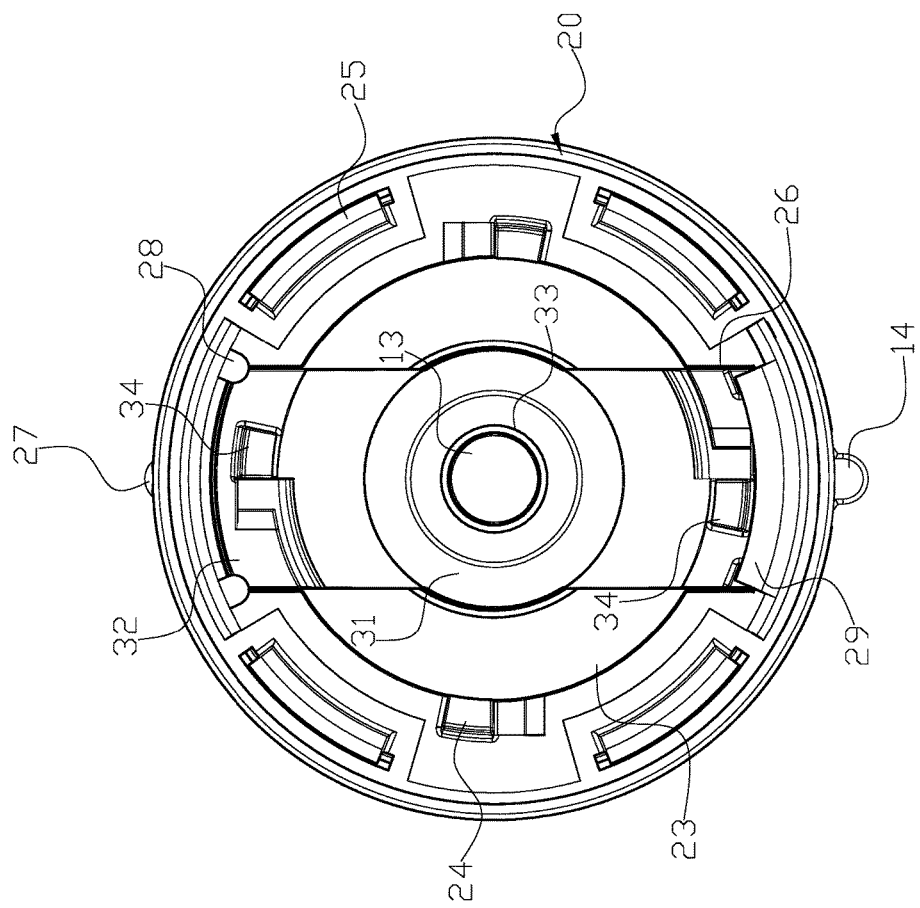
FIG. 4 is a plane view illustrating the connection between a locating unit and a pressing unit of the suction cup in the present invention.
Figure 5:
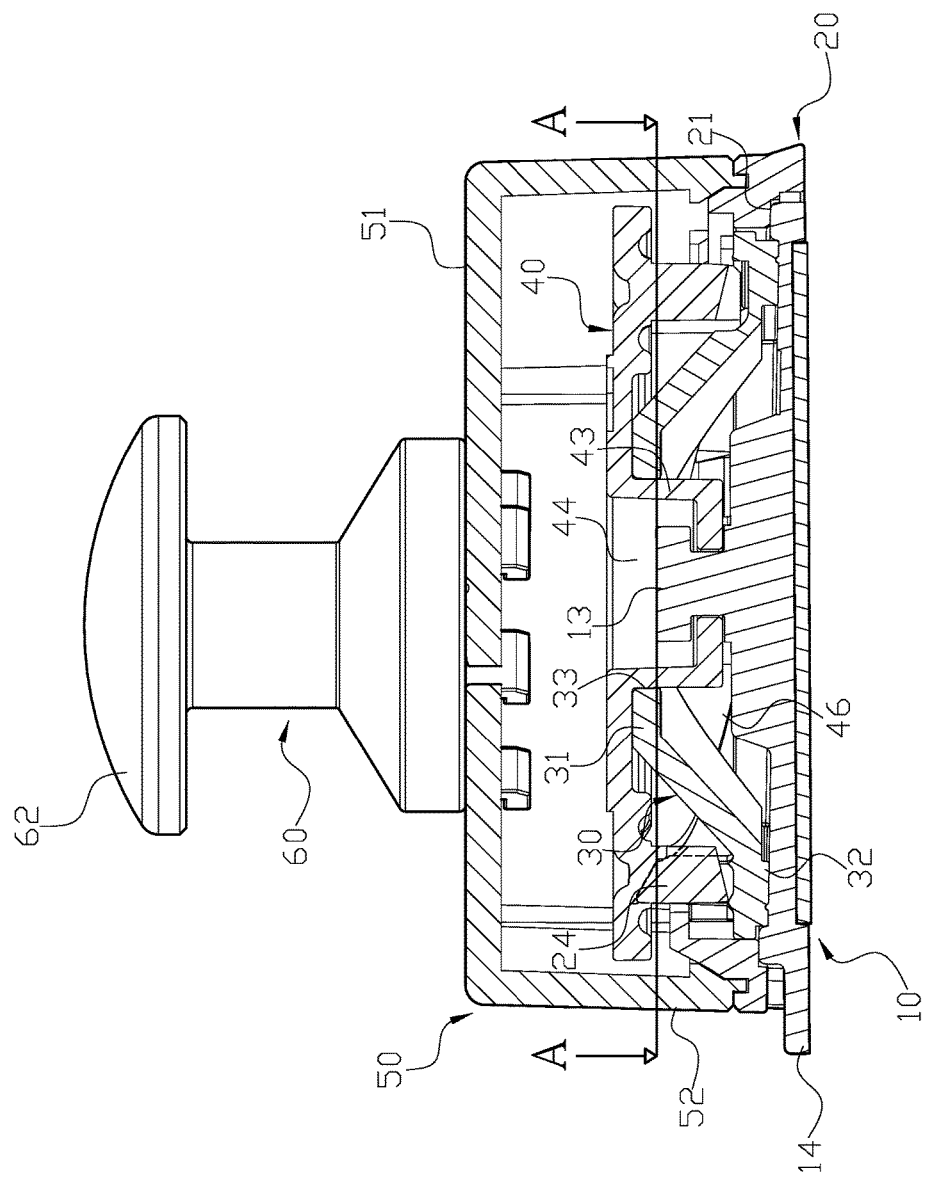
FIG. 5 is a sectional view of the suction in the present invention.
Figure 6:
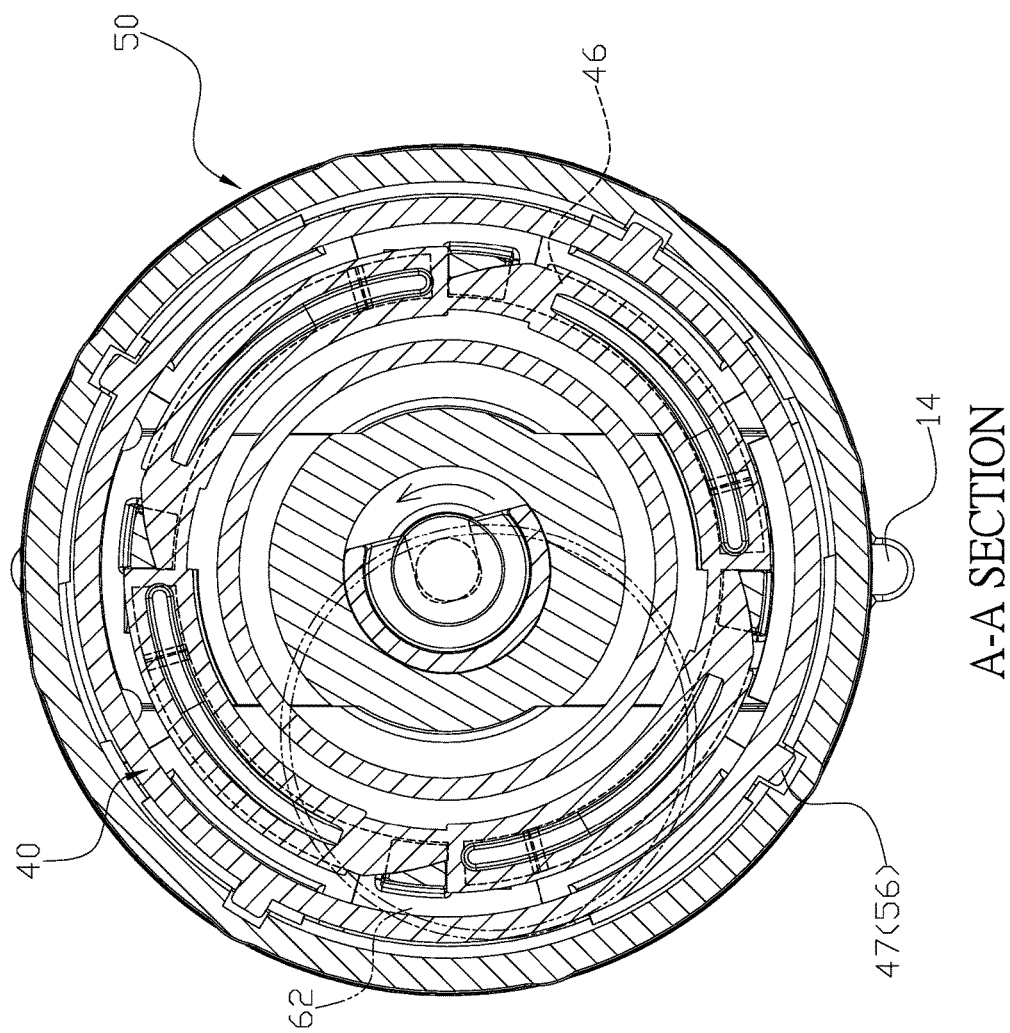
FIG. 6 is a sectional view along line A-A of FIG. 5.

In a further embodiment, referring to FIG. 4, an upper portion and a lower portion of the locating unit (20) respectively comprise at least two first engaging portions (28) and a second engaging piece (29), which are configured to limit positions of the lower parts (32) of the pressing unit (30) thereby securing the pressing unit (30) in the first through hole (23) of the locating unit (20) and preventing it from being twisted.

Figure 10:
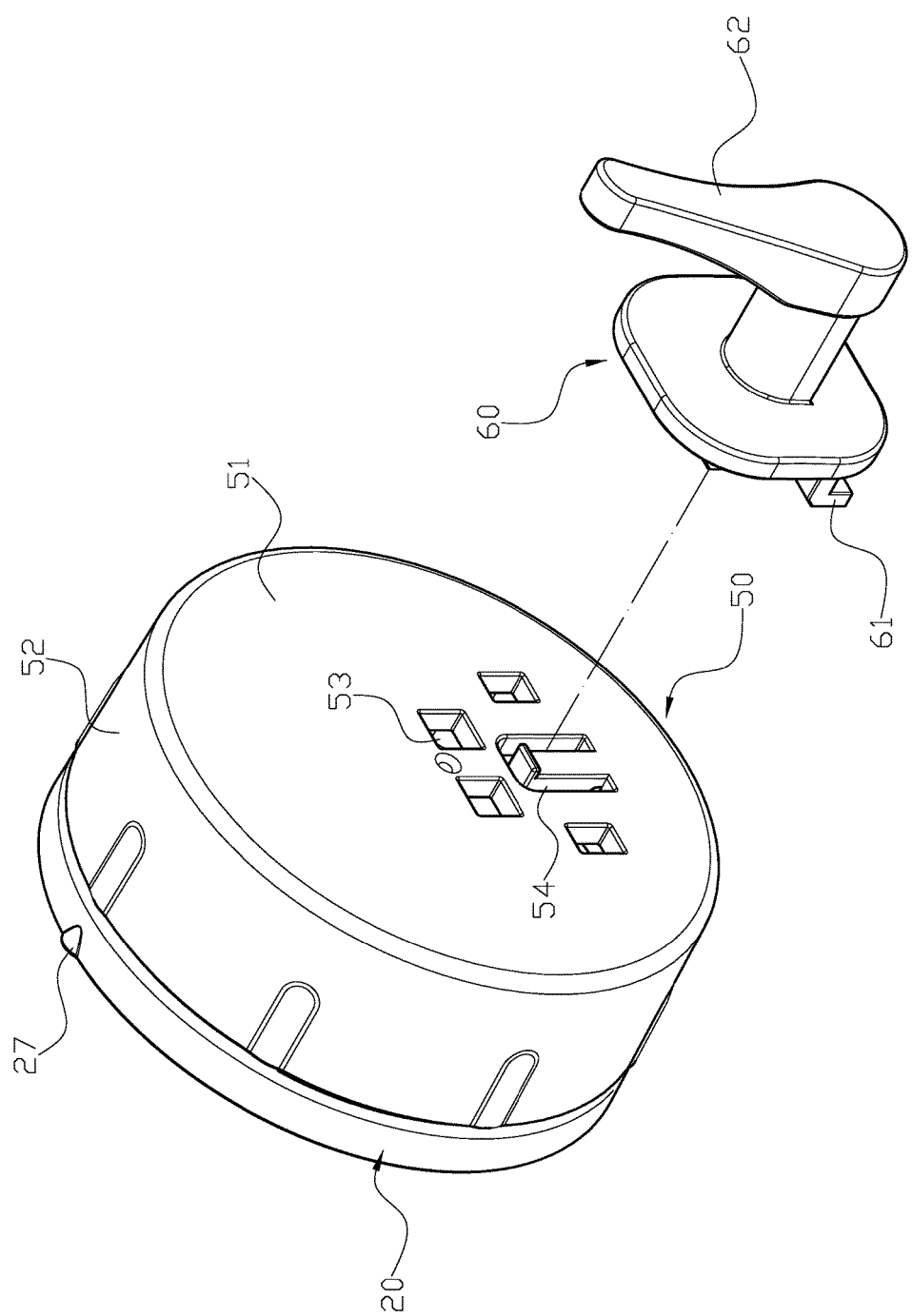
FIG. 10 is a three-dimensional view illustrating the suction cup in the present invention connected with a connecting unit in one embodiment.
Figure 11:
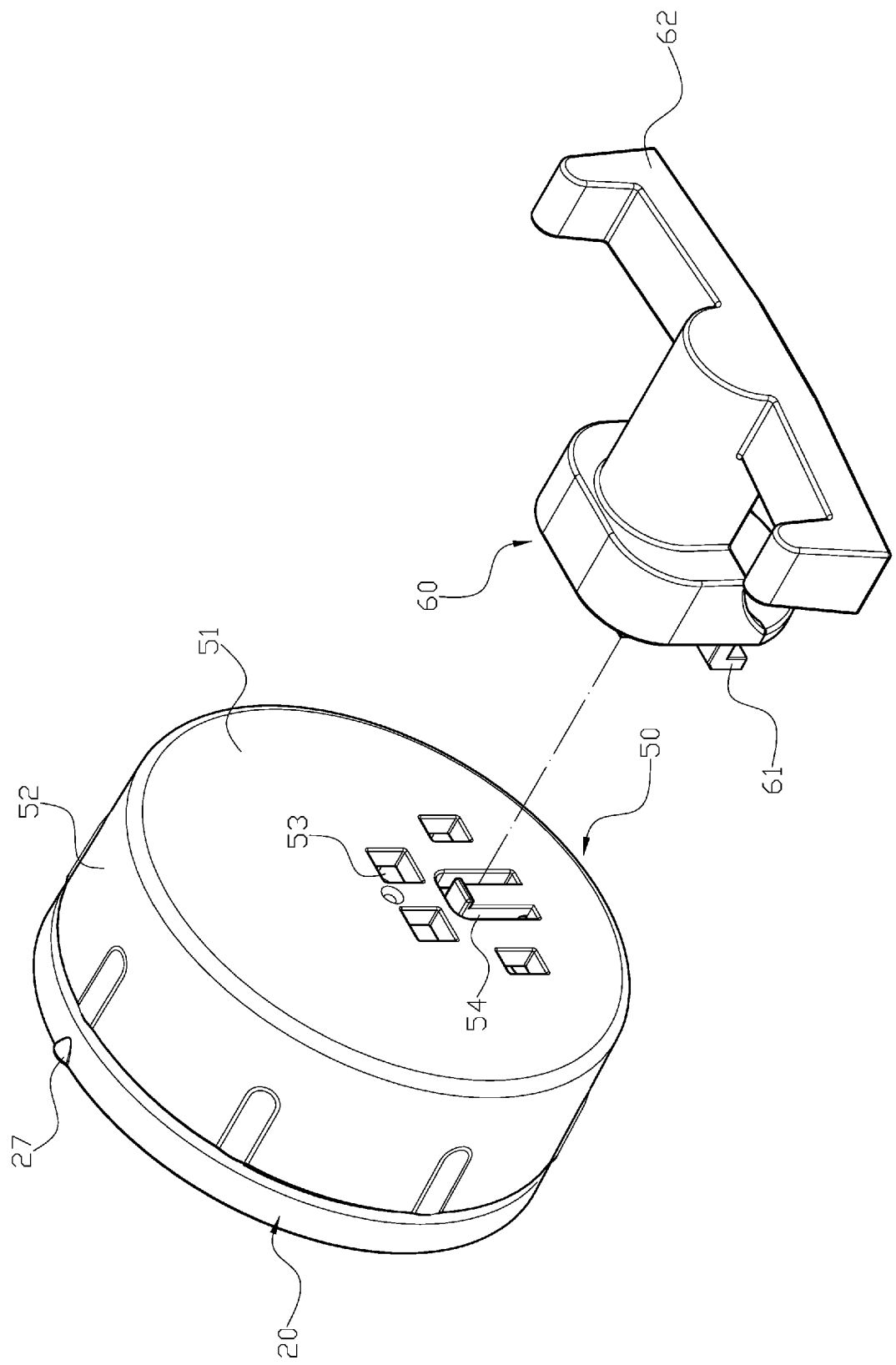
FIG. 11 is a three-dimensional view illustrating the suction cup in the present invention connected with the connecting unit in another embodiment.

In still a further embodiment, the hanging portion (62) of the connecting unit (60) can be formed in any shape and be replaced depending on the need (as shown in FIGS. 2, 10 and 11).

Figure 12:
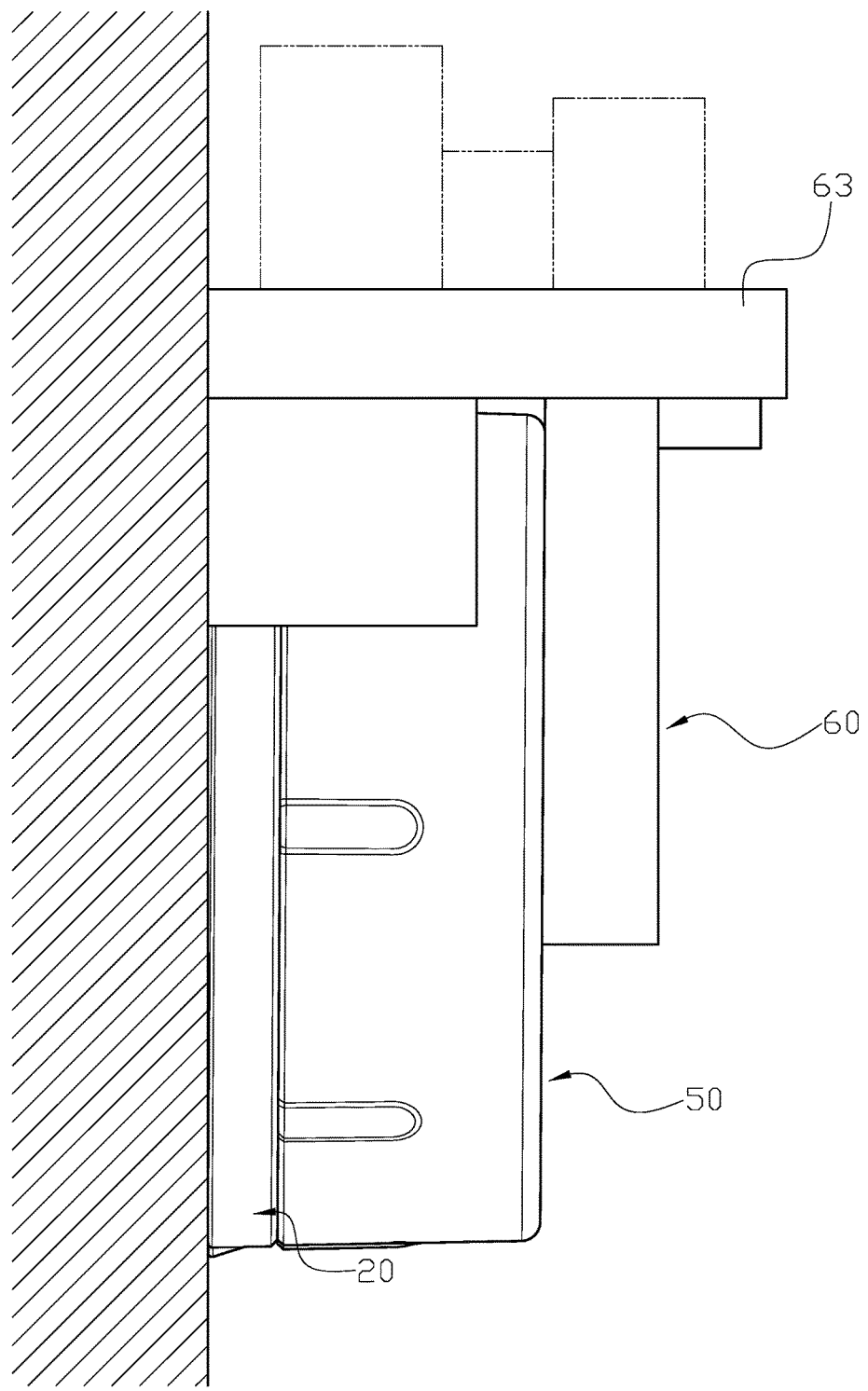
FIG. 12 is a side view illustrating a placing plate of the connecting unit in the present invention providing a space for placing stuffs.
Figure 13:
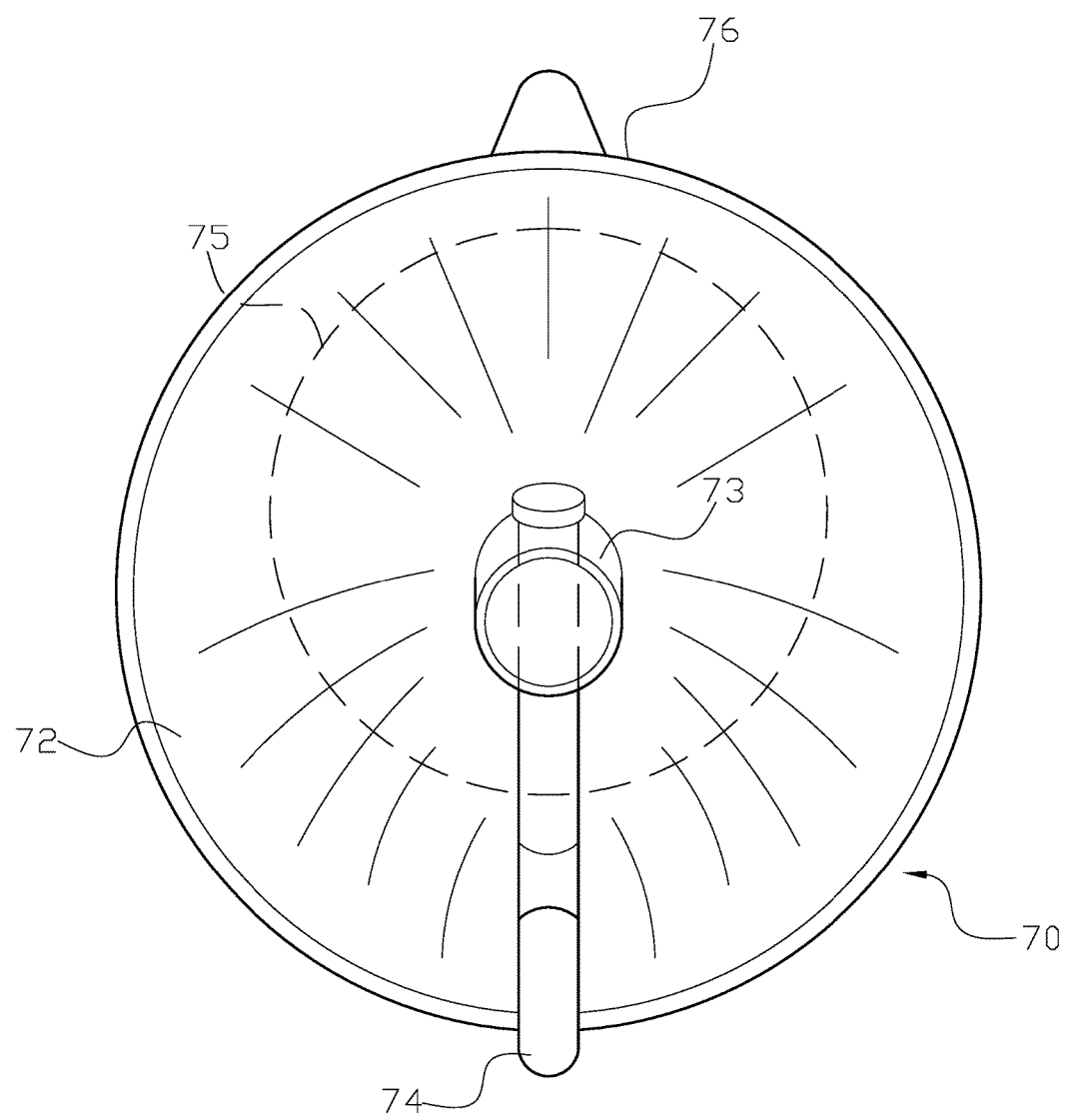
FIG. 13 is a prior art.
Figure 14:
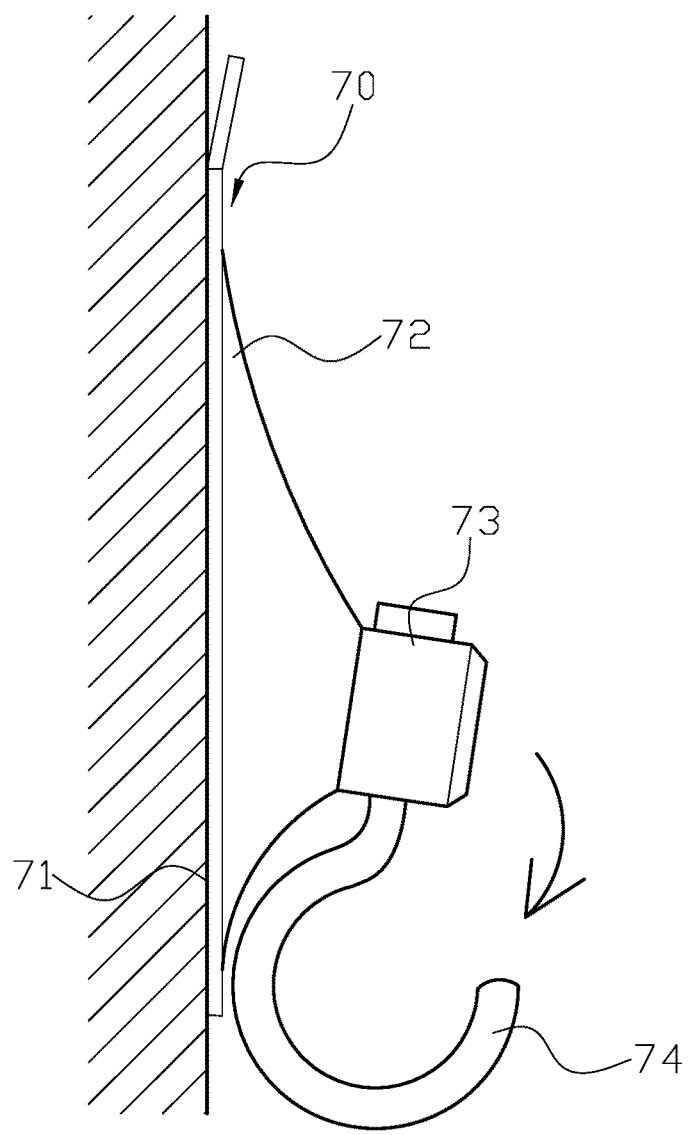
FIG. 14 is a prior art.

In yet a further embodiment, when a user rotates the shell (50) with 180 degree and attaches the suction cup of the present invention on a surface through the cup body (10), the rotated placing plate (63) of the connecting unit (60) is used to provide a place for placing stuffs (as shown in FIG. 12).

In a particular embodiment, the connecting unit (60) is secured on the shell (50) at an off-center position.

Figure 7:
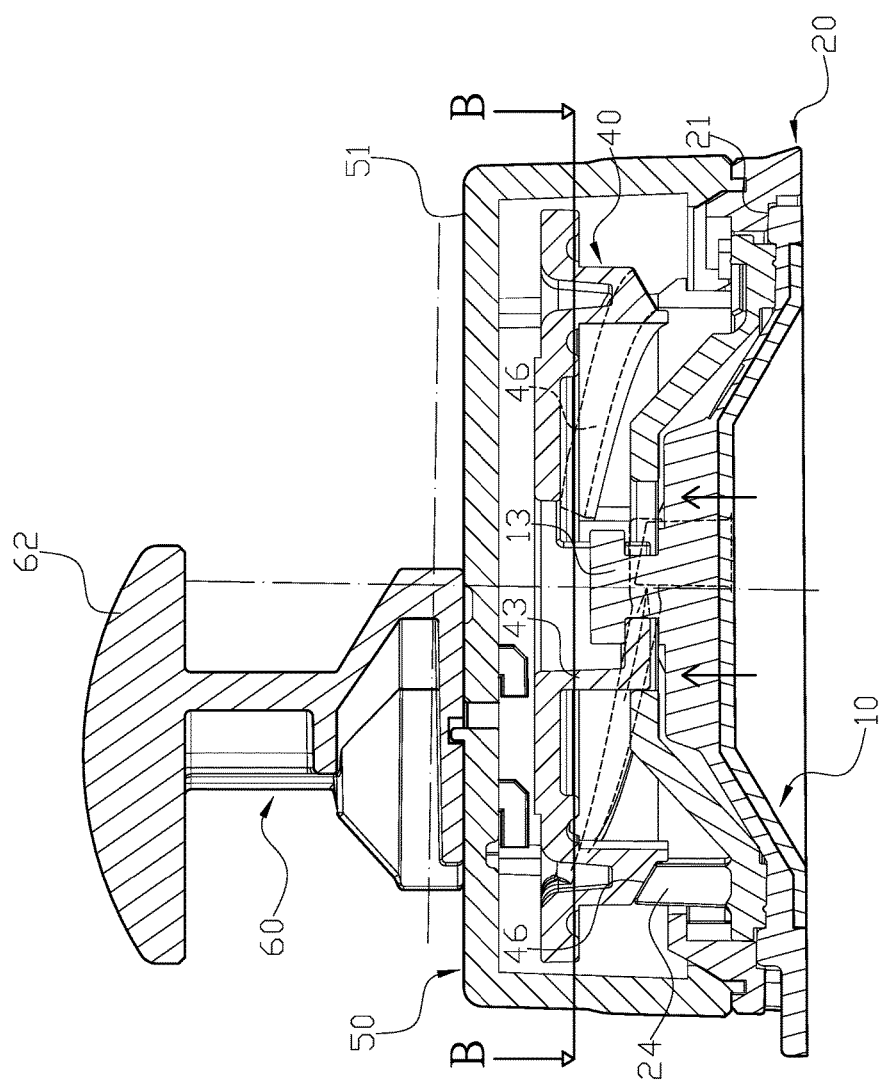
FIG. 7 is a sectional view illustrating the attaching status of the suction cup in the present invention.
Figure 8:
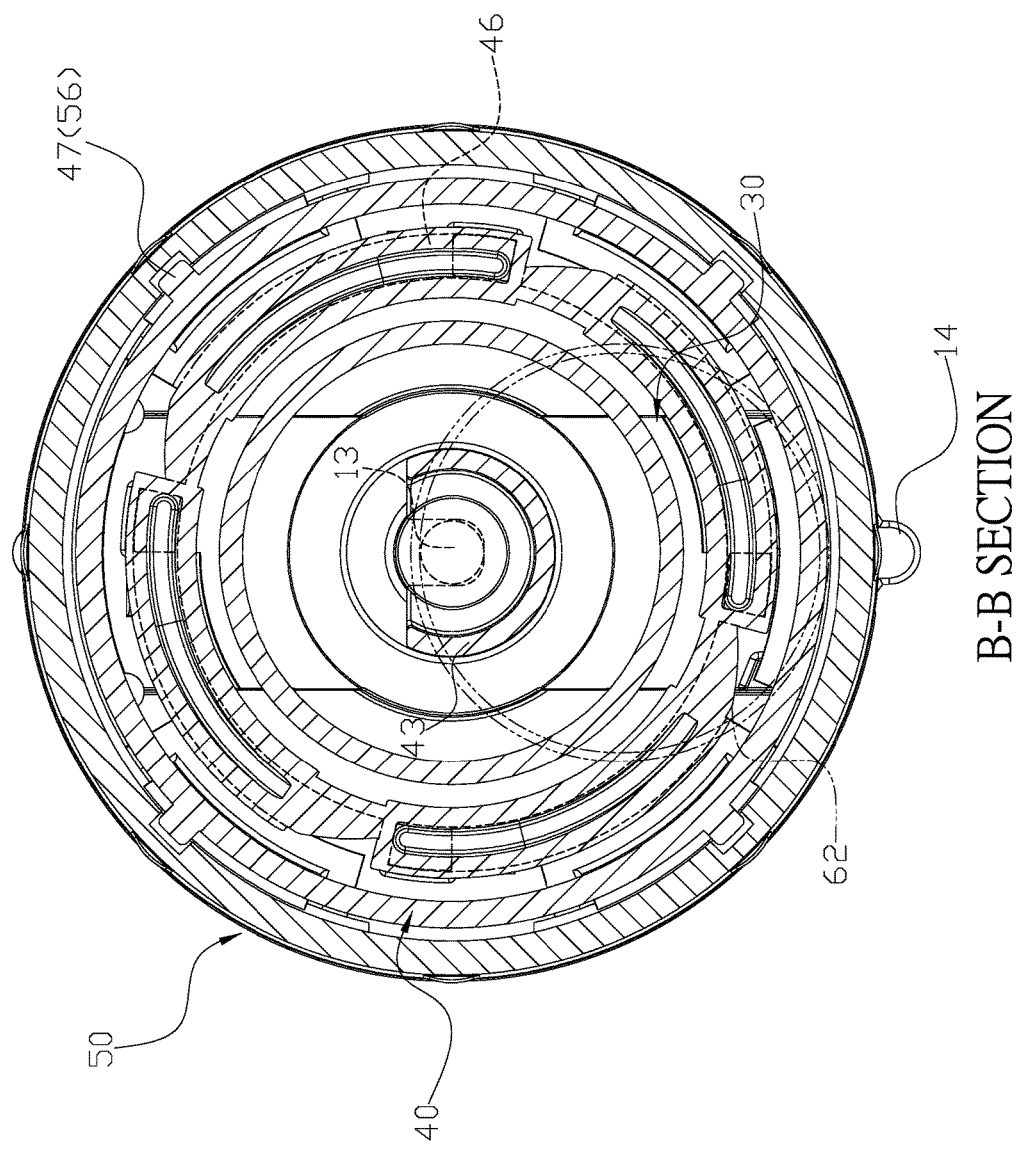
FIG. 8 is a sectional view along line B-B of FIG. 7.
Figure 9:
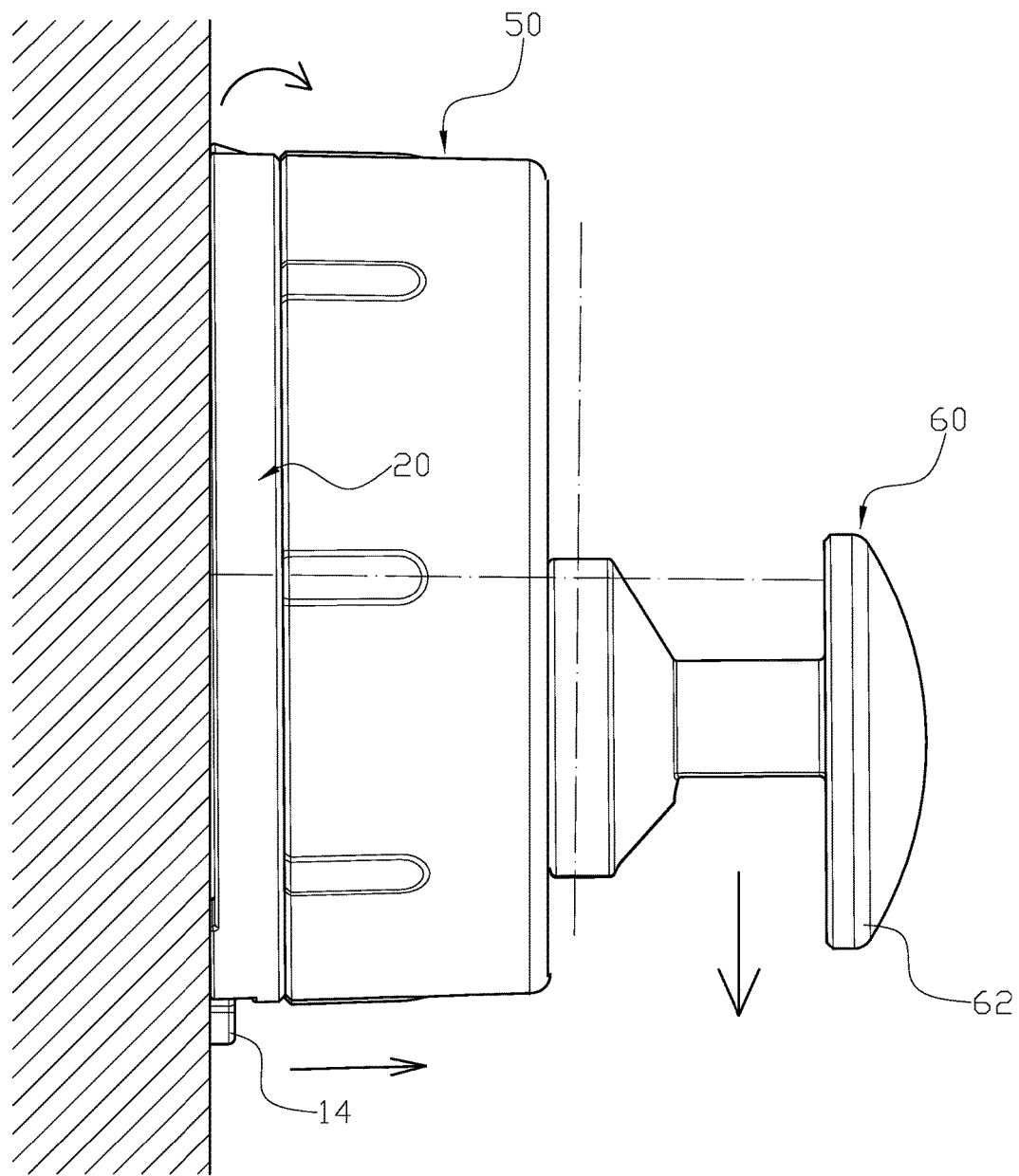
FIG. 9 is a side view illustrating the suction cup in the present invention is in use.

Referring to FIGS. 7 to 9, in actual application, the suction cup (10) is attached on a surface such as a wall or a glass with the recognizing portion (27) positioned on the top, and by rotating the shell (50) to drive the rotating plate (40), the rail (46) is rotated from a lower position to an upper position such that the rotating plate (40) can be supported by the second protruding piece (34). Also, when the stepped column (13) of the cup body (10) is pulled by the central axle (43) of the rotating plate (40), the outer periphery of the cup body (10) is pressed by the locating unit (20) and the pressing unit (30) to create vacuum suction inside the cup body (10) thereby firmly attaching the suction cup on a surface. Furthermore, with the design of the hanging portion (62) of the connecting unit (60), the suction cup of the present invention can be used to hang stuffs.

Comparing with conventional suction cup, the present invention is advantageous because: (i) the central axle (43) penetrates the second through hole (33) of the pressing unit (30) and then engages with the stepped column (13) such that the upper part (31) and the second through hole (33) are configured to secure and prevent the central axle (43) from swing or shifting due to the heavy load; (ii) with the suction face (11) of the cup body (10) and the outer face (21) of the locating unit (20), the suction cup can efficiently support the downward force from the shell (50) when the stuffs are hung or placed on the connecting unit (60); and (iii) since the pressing unit (30) is secured in the recessed portions (26) and borne against the central axle (43) to strengthen the interior structure of the suction cup, the central axle (43) is not swung or shifted by heavy load thereby preventing a vacuum zone of the cup body (10) from moving toward an upper edge resulting in breaking an air-tight seal and causing the cup body (10) to detach from the surface.

Having described the invention by the description and illustrations above, it should be understood that these are exemplary of the invention and are not to be considered as limiting. Accordingly, the invention is not to be considered as limited by the foregoing description, but includes any equivalents.

What is claimed is:

1. A suction cup comprising:
    a cup body having a suction face and a rear face which is formed at an opposing side of the suction face, and a thickness between the suction face and the rear face being gradually thicker from top to bottom thus allowing the suction face to be a tilted surface, and a central portion of the rear face comprising a stepped column;
    a locating unit comprising an outer face and an inner face which is formed at an opposing side of the outer face, and a first through hole formed at a central portion of the locating unit, the outer face which is tilted configured to bear against an outer periphery of the rear face of the cup body, and a plurality of first protruding pieces and locking portions protruding from the inner face of the locating unit, and each of a top edge and a bottom edge of the first through hole comprising a recessed portion;
    a pressing unit having an upper part, and two lower parts respectively protruding from two opposite edges of the upper part with an angle, a second through hole penetrating through a central portion of the upper part, and each of two lower parts comprising at least a second protruding piece;
    a rotating plate having a first surface and a second surface, and a central axle protruding from a central portion of the first surface, a stepped hole formed at a central portion of the second surface, and a sliding slot, which is located at an outer periphery of the central axle, communicated with the stepped hole thereby the stepped column configured to pass through the sliding slot and be secured in the stepped hole, a rail, which has a slope surface, formed around the central axle on the first surface, and a plurality of bumps protruding from an outer periphery of the rotating plate;
    a shell comprising a roof and an annual wall, and an inner periphery of the annual wall having a locating piece and a plurality of grooves, and each of the grooves extended from the roof toward an opening of the shell; and
    wherein the pressing unit is located in the first through hole of the locating unit, and the two lower parts of the pressing unit are respectively secured in the two recessed portions of the locating unit, and the central axle of the rotating plate passes through the second through hole of the pressing unit and is secured in the first through hole of the locating unit; wherein the cup body is configured to connect to the rotating plate by engaging the stepped column with the stepped hole through the sliding slot, and the lower parts of the pressing unit and the outer face of the locating unit are configured to bear against the outer periphery of the rear face of the cup body, and the first protruding pieces and the second protruding pieces are configured to support the rail of the rotating plate; wherein the rotating plate is connected to the shell by sliding each of bumps in the grooves, and the rotating plate is engaged and configured to rotate with the shell simultaneously, and after connecting the shell with the locating unit, with locking portions of the locating unit and the locating piece of the shell, the shell is configured to rotate relative to the locating unit without falling out therefrom; and wherein a connecting unit is secured on the roof of the shell.

2. The suction cup of claim 1, wherein a lifting tab protrudes from a bottom edge of the cup body.

3. The suction cup of claim 1, wherein the cup body is integrally formed of a single material.

4. The suction cup of claim 1, wherein the cup body is formed of a double-layer composite material.

5. The suction cup of claim 1, wherein a recognizing portion is formed at an outer periphery of the locating unit.

6. The suction cup of claim 1, wherein an upper portion and a lower portion of the locating unit respectively comprise at least two first engaging portions and a second engaging piece, which are configured to limit positions of the lower parts of the pressing unit thereby securing the pressing unit in the first through hole of the locating unit and preventing the pressing unit from being twisted.

7. The suction cup of claim 1, wherein the connecting unit is secured on the shell at an off-center position.

8. The suction cup of claim 1, wherein the roof of the shell has at least a connecting hole and an engaging hole while the connecting unit comprises at least a hook, and after the hook is coupled with the engaging hole, the connecting unit is secured on the roof through the engaging hole.

9. The suction cup of claim 1, wherein a hanging portion protruding from the connecting unit is configured to provide a hanging place for stuffs.

10. The suction cup of claim 1, wherein a placing plate protruding from the connecting unit is configured to provide a placing place for stuffs.

* * * * *